United States Patent
Nihei

(10) Patent No.: US 7,112,263 B2
(45) Date of Patent: Sep. 26, 2006

(54) POLARIZATION INVERSION METHOD FOR FERROELECTRIC SUBSTANCES

(75) Inventor: Yasukazu Nihei, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 507 days.

(21) Appl. No.: 10/327,062

(22) Filed: Dec. 24, 2002

(65) Prior Publication Data

US 2003/0116424 A1   Jun. 26, 2003

(30) Foreign Application Priority Data

Dec. 25, 2001  (JP) .............................. 2001-391874

(51) Int. Cl.
*B01J 19/08* (2006.01)
*G02F 1/00* (2006.01)

(52) U.S. Cl. ................. 204/164; 204/157.15; 205/766; 427/100; 29/25.35; 359/326; 361/225

(58) Field of Classification Search ............... 204/164, 204/157.15; 205/766; 361/225; 29/25.35; 359/326; 427/100
See application file for complete search history.

(56) References Cited

U.S. PATENT DOCUMENTS

| | | | |
|---|---|---|---|
| 5,193,023 A * | 3/1993 | Yamada et al. ............ | 359/245 |
| 5,249,250 A | 9/1993 | Yamada et al. | |
| 5,594,746 A | 1/1997 | Harada | |

* cited by examiner

*Primary Examiner*—Kishor Mayekar
(74) *Attorney, Agent, or Firm*—Sughrue Mion, PLLC

(57) ABSTRACT

A pattern electrode having a predetermined pattern and a connecting electrode connected to the pattern electrode are formed on one surface of a single-polarized ferroelectric substance crystal. An electric field is applied across the ferroelectric substance crystal with corona charging or electron beam irradiation from the side of the other surface of the ferroelectric substance crystal. A polarization inversion region having a shape corresponding to the predetermined pattern is thus formed in the ferroelectric substance crystal. The electric field is applied in a state, in which an electrical insulating material is located on the other surface of the ferroelectric substance crystal and at a position corresponding to at least a position of a certain area of the connecting electrode.

16 Claims, 2 Drawing Sheets

POLARIZATION INVERSION METHOD FOR FERROELECTRIC SUBSTANCES

BACKGROUND OF THE INVENTION

1. Field of the Invention

This invention relates to a method of forming a polarization inversion region by applying an electric field across a ferroelectric substance crystal. This invention particularly relates to a polarization inversion method for a ferroelectric substance, wherein an electrode having a predetermined pattern is formed on a surface of a ferroelectric substance crystal, and an electric field is applied across the ferroelectric substance crystal in this state in order to cause polarization inversion to occur in accordance with the shape of the electrode. This invention also relates to a process for producing an optical wavelength converting device, wherein the polarization inversion method for a ferroelectric substance is utilized.

2. Description of the Related Art

A technique for performing wavelength conversion of a fundamental wave to its second harmonic by use of an optical wavelength converting device provided with regions, in which spontaneous polarization (domain) of a ferroelectric substance having a nonlinear optical effect has been inverted periodically, has been proposed by Bleombergen, et al. (The proposed technique for performing the wavelength conversion is described in Phys. Rev., Vol. 127, No. 6, 1918, 1962.) With the proposed technique for performing the wavelength conversion, phase matching between the fundamental wave and its second harmonic is capable of being effected by setting a period $\Lambda$ of the polarization inversion regions at integral multiples of a coherence length $\Lambda c$, which is represented by Formula (1) shown below.

$$\Lambda c = 2\pi / \{\beta(2\omega) - 2\beta(\omega)\} \quad (1)$$

wherein $\beta(2\omega)$ represents the propagation constant of the second harmonic, and $\beta(\omega)$ represents the propagation constant of the fundamental wave.

In cases where the wavelength conversion is performed by use of a bulk crystal of a nonlinear optical material, the wavelength at which the phase matching is effected is limited to a specific wavelength inherent to the crystal. However, with the proposed technique for performing the wavelength conversion described above, in cases where the period $\Lambda$ of the polarization inversion regions, which satisfies Formula (1) shown above, is selected with respect to an arbitrary wavelength, the phase matching (i.e., the so-called "pseudo-phase matching") is capable of being effected efficiently.

One of techniques for forming the periodic polarization inversion structure described above has been disclosed in, for example, U.S. Pat. No. 5,594,746. With the disclosed technique for forming the periodic polarization inversion structure, periodic electrodes having a predetermined pattern are formed on one surface of a single-polarized ferroelectric substance crystal having a nonlinear optical effect, corona charging of the ferroelectric substance crystal is performed with the periodic electrodes and a corona wire, which is located on the side of the other surface of the ferroelectric substance crystal opposite to the one surface described above, in order to apply an electric field across the ferroelectric substance crystal, and local area limited polarization inversion is thereby caused to occur at regions of the ferroelectric substance crystal, which regions stand facing the periodic electrodes.

Besides the technique for forming the periodic polarization inversion structure by the utilization of the corona charging, a technique for forming the periodic polarization inversion structure by the utilization of an electron beam has been proposed in, for example, U.S. Pat. No. 5,249,250 and a literature "FABRICATION OF DOMAIN REVERSED GRATINGS FOR SHG IN $LiNbO_3$ BY ELECTRON BEAM BOMBARDMENT," ELECTRONIC LETTERS, Vol. 26, No. 3, pp. 188–189, February 1990. With the proposed technique for forming the periodic polarization inversion structure by the utilization of an electron beam, an electron beam is irradiated onto one surface of a single-polarized ferroelectric substance crystal having a nonlinear optical effect, an electric field is thus applied across the ferroelectric substance crystal, and a local area limited polarization inversion region is thereby formed in the ferroelectric substance crystal.

In cases where the electric field is applied across the ferroelectric substance crystal by use of the periodic electrodes described above, it is necessary that the side of the periodic electrodes is grounded. The periodic electrodes are constituted of a plurality of electrodes which are arrayed with a predetermined period. Therefore, in order for the periodic electrodes to be grounded, ordinarily, a technique for applying the electric field across the ferroelectric substance crystal is employed, wherein a single connecting electrode, which is electrically connected to the periodic electrodes, is formed on the surface of the ferroelectric substance crystal and is electrically connected to the ground via a wire.

In cases where the aforesaid technique for applying the electric field across the ferroelectric substance crystal is employed, if the connecting electrode is located within, for example, the regions, which are to be corona-charged, or the regions, to which the electron beam is to be irradiated, the polarization inversion will also occur in the areas of the ferroelectric substance crystal, which areas stand facing the connecting electrode. In such cases, if the amount of inverted electric charges is large, depending upon the thickness of the ferroelectric substance crystal, the area of inversion, and the period, it will often occur that the areas of the ferroelectric substance crystal, which areas stand facing the connecting electrode, suffer from breakage (cracking, and the like). Particularly, the crystal breakage occurs primarily at a bent area of the connecting electrode, which bent area is electrically connected to the periodic electrodes described above.

Also, particularly, the aforesaid problems with regard to the crystal breakage are markedly encountered with an $LiNb_xTa_{1-x}O_3$ crystal, where $0 \leq x \leq 1$, or an $LiNb_xTa_{1-x}O_3$ crystal, where $0 \leq x \leq 1$, having been doped with MgO, ZnO, or Sc, which crystal has the characteristics such that an electric conductivity of the ferroelectric substance crystal changes largely before the polarization inversion occurs and after the polarization inversion has occurred, and the electric charges are apt to concentrate at initial inversion areas.

Besides the cases where the periodic polarization inversion regions are formed by use of the periodic electrodes described above, the aforesaid problems with regard to the crystal breakage are also encountered in cases where the electric field is applied across the ferroelectric substance crystal with corona charging or electron beam irradiation by use of the electrode having a predetermined pattern and the connecting electrode electrically connected to the electrode having the predetermined pattern.

If the crystal breakage occurs, the ferroelectric substance crystal will become a defective produce, and the yield of polarization inversion will become low. Also, in cases where the optical wavelength converting device described above is produced by forming the periodic polarization inversion structure in the ferroelectric substance crystal with the aforesaid technique for applying the electric field across the ferroelectric substance crystal, if the yield of polarization inversion is low, the cost of the optical wavelength converting device cannot be kept low.

SUMMARY OF THE INVENTION

The primary object of the present invention is to provide a polarization inversion method for a ferroelectric substance, wherein an electric field is applied across a ferroelectric substance crystal with corona charging or electron beam irradiation by use of an electrode having a predetermined pattern and a connecting electrode electrically connected to the electrode having the predetermined pattern, such that areas of the ferroelectric substance crystal, which areas stand facing the connecting electrode, do not suffer from breakage.

Another object of the present invention is to provide a process for producing an optical wavelength converting device, wherein a periodic polarization inversion structure is capable of being formed with a high yield in a nonlinear optical crystal, which is a ferroelectric substance.

The present invention provides a first polarization inversion method for a ferroelectric substance, comprising the steps of:

i) forming a pattern electrode, which has a predetermined pattern, and a connecting electrode, which is electrically connected to the pattern electrode, on one surface of a single-polarized ferroelectric substance crystal, ii) locating a corona wire at a position which stands facing the other surface of the ferroelectric substance crystal, and iii) applying an electric field across the ferroelectric substance crystal with a corona charging technique by use of the corona wire and the pattern electrode, whereby a polarization inversion region having a shape corresponding to the predetermined pattern of the pattern electrode is formed in the ferroelectric substance crystal, wherein the application of the electric field is performed in a state, in which an electrical insulating material is located on the other surface of the ferroelectric substance crystal and at a position that corresponds to at least a position of a certain area of the connecting electrode.

The present invention also provides a second polarization inversion method for a ferroelectric substance, comprising the steps of:

i) forming a pattern electrode, which has a predetermined pattern, and a connecting electrode, which is electrically connected to the pattern electrode, on one surface of a single-polarized ferroelectric substance crystal, and ii) applying an electric field across the ferroelectric substance crystal with irradiation of an electron beam to the ferroelectric substance crystal from the side of the other surface of the ferroelectric substance crystal, whereby a polarization inversion region having a shape corresponding to the predetermined pattern of the pattern electrode is formed in the ferroelectric substance crystal, wherein the application of the electric field is performed in a state, in which an electrical insulating material is located on the other surface of the ferroelectric substance crystal and at a position that corresponds to at least a position of a certain area of the connecting electrode.

Each of the first and second polarization inversion methods for a ferroelectric substance in accordance with the present invention should preferably be modified such that the electrical insulating material is located at a position that corresponds to at least a position of a bent area of the connecting electrode.

Also, each of the first and second polarization inversion methods for a ferroelectric substance in accordance with the present invention should preferably be modified such that the pattern electrode comprises a plurality of periodic electrodes, which are arrayed with a predetermined period, and the connecting electrode is electrically connected to each of the periodic electrodes in order to connect the periodic electrodes to one another.

In such cases, each of the first and second polarization inversion methods for a ferroelectric substance in accordance with the present invention should more preferably be modified such that the electrical insulating material is located at a position that corresponds to at least a position of a bent area of the connecting electrode, which bent area is electrically connected to the periodic electrodes.

Further, each of the first and second polarization inversion methods for a ferroelectric substance in accordance with the present invention should preferably be modified such that the ferroelectric substance crystal is a crystal selected from the group consisting of an $LiNb_xTa_{1-x}O_3$ crystal, where $0 \leqq x \leqq 1$, an MgO-doped $LiNb_xTa_{1-x}O_3$ crystal, where $0 \leqq x \leqq 1$, a ZnO-doped $LiNb_xTa_{1-x}O_3$ crystal, where $0 \leqq x \leqq 1$, and an Sc-doped $LiNb_xTa_{1-x}O_3$ crystal, where $0 \leqq x \leqq 1$.

The present invention further provides a process for producing an optical wavelength converting device, in which the first or second polarization inversion method for a ferroelectric substance in accordance with the present invention, wherein the periodic electrodes and the connecting electrode electrically connected to the periodic electrodes are utilized, is employed, the process comprising the steps of:

a) utilizing a nonlinear optical crystal as the single-polarized ferroelectric substance crystal, and b) forming a periodic polarization inversion structure, which corresponds to a pattern of the periodic electrodes, in the nonlinear optical crystal.

Effects of the first and second polarization inversion methods for a ferroelectric substance in accordance with the present invention and the process for producing an optical wavelength converting device in accordance with the present invention will be described hereinbelow.

Specifically, the inventors conducted extensive research and found that the aforesaid problems with regard to the crystal breakage, which problems had been encountered with the conventional techniques, occur due to concentration of electric charges at a certain area of the connecting electrode, particularly at the bent area of the connecting electrode, which bent area is electrically connected to the periodic electrodes. In view of the above findings, with each of the first and second polarization inversion methods for a ferroelectric substance in accordance with the present invention, the application of the electric field across the ferroelectric substance crystal with the corona charging technique or the electron beam irradiation is performed in the state, in which the electrical insulating material is located on the other surface of the ferroelectric substance crystal, the other surface being opposite to the one surface provided with the pattern electrode, and at the position that corresponds to at least the position of the certain area of the connecting electrode. Therefore, at the area of the ferroelectric substance crystal, which area stands facing the electrical insulating material, the application of the electric field is suppressed by the electrical insulating material regardless of the presence of the connecting electrode, which stands facing the area of the ferroelectric substance crystal. As a result, the ferroelectric substance crystal is capable of being prevented from being broken due to the concentration of the electric charges.

The aforesaid concentration of the electric charges is apt to occur particularly at the area of the ferroelectric substance crystal, which area corresponds to the bent area of the connecting electrode. Therefore, with each of the first and second polarization inversion methods for a ferroelectric substance in accordance with the present invention, wherein the electrical insulating material is located at the position that corresponds to at least the position of the bent area of the connecting electrode, the ferroelectric substance crystal is capable of being more efficiently prevented from being broken due to the concentration of the electric charges.

From the point of view described above, each of the first and second polarization inversion methods for a ferroelectric substance in accordance with the present invention may be modified such that the pattern electrode comprises the plurality of the periodic electrodes, which are arrayed with the predetermined period, and the connecting electrode is electrically connected to each of the periodic electrodes in order to connect the periodic electrodes to one another. Also, the electrical insulating material maybe located at the position that corresponds to at least the position of the bent area of the connecting electrode, which bent area is electrically connected to the periodic electrodes. In such cases, the ferroelectric substance crystal is capable of being efficiently prevented from being broken due to the concentration of the electric charges.

Further, as described above, the aforesaid concentration of the electric charges occurs markedly in the cases of the $LiNb_xTa_{1-x}O_3$ crystal, where $0 \leq x \leq 1$, or the $LiNb_xTa_{1-x}O_1O_3$ crystal, where $0 \leq x \leq 1$, having been doped with MgO, ZnO, or Sc. Therefore, in cases where each of the first and second polarization inversion methods for a ferroelectric substance in accordance with the present invention is applied when the ferroelectric substance crystal of this type is to be subjected to the local area limited polarization inversion, a particularly marked effect of preventing the breakage of the ferroelectric substance crystal is capable of being obtained.

With the process for producing an optical wavelength converting device in accordance with the present invention, the periodic polarization inversion structure, which corresponds to the pattern of the periodic electrodes, is formed in the ferroelectric substance crystal, which is the nonlinear optical crystal, by the utilization of the first or second polarization inversion method for a ferroelectric substance in accordance with the present invention. Therefore, the breakage of the ferroelectric substance crystal is capable of being prevented from occurring, and the periodic polarization inversion structure is capable of being formed with a high yield. Accordingly, the cost of the optical wavelength converting device is capable of being kept low.

DESCRIPTION OF THE PREFERRED EMBODIMENTS

The present invention will hereinbelow be described in further detail with reference to the accompanying drawings.

Figure 1A:
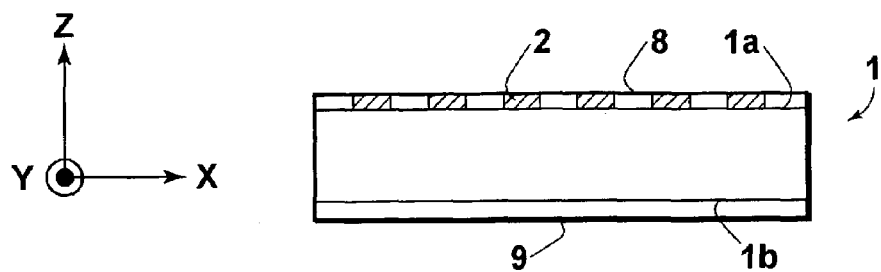
FIGS. 1A, 1B, and 1C are schematic views showing steps of an embodiment of the polarization inversion method for a ferroelectric substance in accordance with the present invention.
Figure 1B:
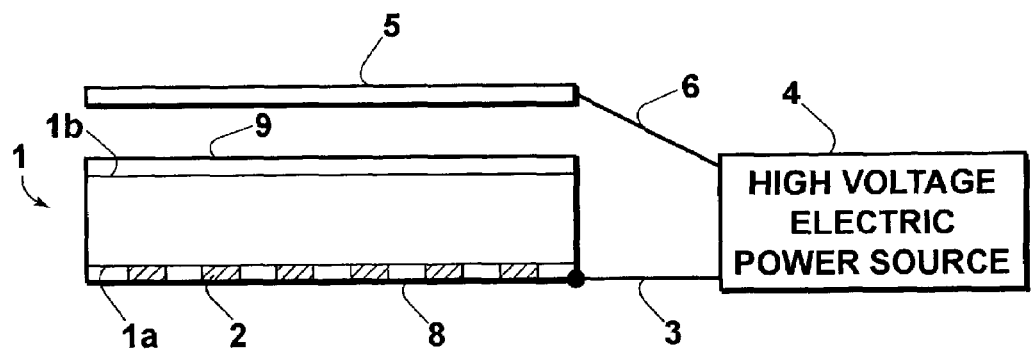
Figure 1C:
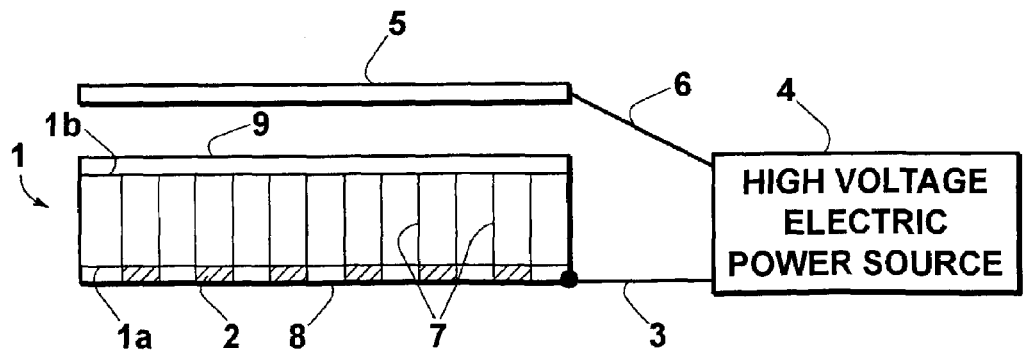

FIGS. 1A, 1B, and 1C are schematic views showing steps of an embodiment of the polarization inversion method for a ferroelectric substance in accordance with the present invention. In this embodiment, a nonlinear optical crystal is employed as the ferroelectric substance crystal, and periodic electrodes having a periodical pattern are employed as the pattern electrode for the application of an electric field. A periodic polarization inversion structure, which corresponds to the periodical pattern of the periodic electrodes, is formed in the nonlinear optical crystal, and an optical wavelength converting device is thus produced.

In FIG. 1A, reference numeral 1 represents a substrate constituted of an $LiNbO_3$ crystal having been doped with 5 mol % of MgO (here in below referred to as the MgO—LN crystal), which crystal is the ferroelectric substance crystal having the nonlinear optical effect. The MgO—LN substrate 1 has been subjected to a single polarization processing and has been formed to a thickness of 0.4 mm. Also, the MgO—LN substrate 1 has been cut along a z face such that the largest non linear optical constant $d_{33}$ is capable of being utilized efficiently. Further, the MgO—LN substrate 1 has then been subjected to optical polishing.

Figure 2:
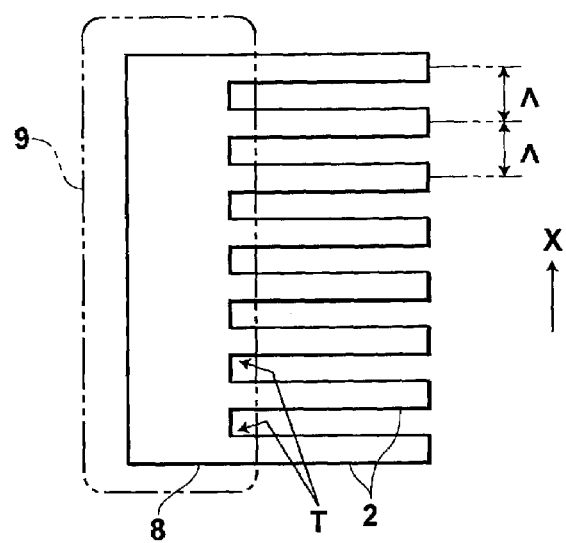
FIG. 2 is a plan view showing periodic electrodes, a connecting electrode, and an electrical insulating film employed in the embodiment of the polarization inversion method for a ferroelectric substance in accordance with the present invention.

With a vacuum evaporation processing or a sputtering processing, a Cr thin film having a thickness of, for example, 50 nm is formed on a +Z face 1a of the MgO—LN substrate 1. Thereafter, as illustrated in FIG. 1A, with photolithography, periodic electrodes 2, 2, . . . , which are constituted of the Cr thin film and act as the pattern electrode, and a connecting electrode 8, which has an approximately rectangular shape and is electrically connected to the periodic electrodes 2, 2, . . . , are formed on the +Z face 1a of the MgO—LN substrate 1. FIG. 2 is a plan view showing the periodic electrodes 2, 2, . . . , the connecting electrode 8, and an electrical insulating film, which will be described later. As illustrated in FIG. 2, a plurality of the periodic electrodes 2, 2, . . . are arrayed with a predetermined period so as to stand side by side with respect to an X-axis direction of the MgO—LN substrate 1. Each of the periodic electrodes 2, 2, . . . is electrically connected to the connecting electrode 8. Therefore, all of the periodic electrodes 2, 2, . . . are connected to one another via the connecting electrode 8 and are set in an electrically conducting state.

In this embodiment, the MgO—LN substrate 1 has a length (i.e., the dimension in the X-axis direction) of 45 mm, and a width (i.e., the dimension in a Y-axis direction) of 5 mm. Also, the periodic electrodes 2, 2, . . . are arrayed with a predetermined period of $\Lambda=19$ μm.

Further, an electrical insulating film 9 is formed on a −Z face 1b of the MgO—LN substrate 1, such that the electrical insulating film 9 is opposed to the entire area of the surface of the connecting electrode 8. By way of example, the electrical insulating film 9 may be made from a resist for photolithography, or an electrical insulating material, such as an organic resin, $SiO_2$, $Ta_2O_5$, or SiN. The electrical insulating film 9 has a sufficient size so as to be capable of being opposed to areas (i.e., areas T, T, . . . illustrated in FIG. 2), at which the connecting electrode 8 and the periodic electrodes 2, 2, . . . are electrically connected to each other.

Thereafter, as illustrated in FIG. 1B, the connecting electrode 8, which has been electrically connected to the periodic electrodes 2, 2, . . . , is connected by a connecting wire 3 to a high-voltage electric power source 4. Also, a corona wire 5 is located at a position which stands facing the −Z face 1b of the MgO—LN substrate 1. The corona wire 5 is then connected by a connecting wire 6 to the high-voltage electric power source 4. In this manner, an electric field is applied across the MgO—LN substrate 1 with a corona charging technique. In this embodiment, the applied voltage is −3 kV, the applied current is −600 µA, and the electric field application time is 12 s (seconds).

As illustrated in FIG. 1C, with the application of the electric field, polarization inversion regions 7, 7, . . . are formed at the regions of the MgO—LN substrate 1, which regions are located at the positions corresponding to the positions of the periodic electrodes 2, 2, . . . Each of the polarization inversion regions 7, 7, . . . extends from the −Z face 1b of the MgO—LN substrate 1 to the +Z face 1a of the MgO—LN substrate 1. The polarization inversion regions 7, 7, . . . are formed with a period identical with the period A of the periodic electrodes 2, 2, . . . and constitute the periodic polarization inversion structure.

In this embodiment, the electrical insulating film 9 is formed on the −Z face 1b of the MgO—LN substrate 1 and at the position corresponding to the position of the connecting electrode 8, which is formed on the +Z face 1a of the MgO—LN substrate 1. Therefore, the problems are prevented from occurring in that, when the electric field is applied across the MgO—LN substrate 1, the electric charges concentrate at the area of the MgO—LN substrate 1, which area stands facing the connecting electrode 8. Particularly, as illustrated in FIG. 2, the electrical insulating film 9 is also opposed to the areas T, T, . . . , at which the connecting electrode 8 and the periodic electrodes 2, 2, . . . are electrically connected to each other, and at which the concentration of the electric charges is apt to occur as described above. Accordingly, the concentration of the electric charges is suppressed efficiently. As a result, the MgO—LN substrate 1 is capable of being reliably prevented from being broken due to the concentration of the electric charges.

In experiments, the polarization inversion regions 7, 7, . . . were formed in the same manner as that in this embodiment, except that the electrical insulating film 9 was not formed. In such cases, breakage, such as cracking, occurred in the MgO—LN substrate 1 with a frequency of occurrence of approximately 50%. With the embodiment of the polarization inversion method for a ferroelectric substance in accordance with the present invention, the frequency of occurrence of the breakage of the MgO—LN substrate 1 was 0%.

Figure 3:
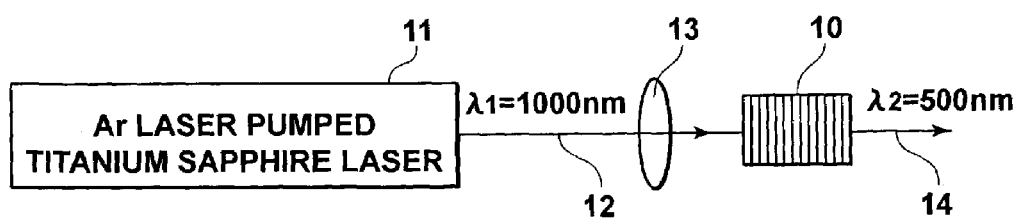
FIG. 3 is a schematic view showing how an optical wavelength converting device having been produced by the utilization of the embodiment of the polarization inversion method for a ferroelectric substance in accordance with the present invention is used.

A center area of the MgO—LN substrate 1, in which the periodic polarization inversion structure has been formed in the manner described above, was cut out. A +X face and a −X face of the cut-out piece of the MgO—LN substrate 1 were then polished, and appropriate coating layers were overlaid on the +X face and the −X face of the cut-out piece. In this manner, an optical wavelength converting device 10 having an optical path length of 3 mm was produced. Also, as illustrated in FIG. 3, a laser beam 12 having a wavelength of $\lambda_1$=1000 nm, which laser beam had been produced by an Ar laser pumped titanium sapphire laser 11, was converged by a converging lens 13, and the converged laser beam 12 was caused to impinge upon the optical wavelength converting device 10. As a result, the laser beam 12 acting as the fundamental wave was converted by the optical wavelength converting device 10 into its second harmonic 14 having a wavelength of $\lambda_2$=500 nm.

With the embodiment described above, the MgO—LN substrate 1 is capable of being prevented from being broken due to the concentration of the electric charges described above, and the periodic polarization inversion structure is capable of being formed with a high yield. Therefore, the cost of the optical wavelength converting device 10 is capable of being kept low.

In the embodiment described above, the periodic polarization inversion structure is formed by use of the periodic electrodes 2, 2, . . . as the pattern electrode. The polarization inversion method for a ferroelectric substance in accordance with the present invention is also applicable when a pattern electrode having one of various other shapes is employed. In cases where a pattern electrode having one of various other shapes is employed, the electrical insulating material may be located at the position corresponding to the position of the bent area of the connecting electrode, which is electrically connected to the pattern electrode. In this manner, the concentration of the electric charges, which is apt to occur at the bent area of the connecting electrode, is capable of being suppressed, and the ferroelectric substance crystal is capable of being efficiently prevented from being broken due to the concentration of the electric charges.

Also, in the embodiment described above, the $LiNbO_3$ crystal having been doped with MgO is employed as the ferroelectric substance crystal. The polarization inversion method for a ferroelectric substance in accordance with the present invention is also applicable when the polarization inversion regions are to be formed in various other kinds of crystals, such as an $LiNbO_3$ crystal having been doped with ZnO or Sc, an undoped $LiNbO_3$ crystal, an $LiTaO_3$ crystal, and an $LiTaO_3$ crystal having been doped with MgO, ZnO, or Sc.

What is claimed is:

1. A polarization inversion method for a ferroelectric substance, comprising the steps of:
   i) forming a pattern electrode, which has a predetermined pattern, and a connecting electrode, which is electrically connected to the pattern electrode, on one surface of a single-polarized ferroelectric substance crystal,
   ii) locating a corona wire at a position which stands facing the other surface of the ferroelectric substance crystal, and
   iii) applying an electric field across the ferroelectric substance crystal with a corona charging technique by use of the corona wire and the pattern electrode, forming a polarization inversion region having a shape corresponding to the predetermined pattern of the pattern electrode in the ferroelectric substance crystal,
   wherein the application of the electric field is performed in a state, in which an electrical insulating material is located on the other surface of the ferroelectric substance crystal and at a position that corresponds to at least a position of a certain area of the connecting electrode.

2. A polarization inversion method for a ferroelectric substance as defined in claim 1 wherein the electrical insulating material is located at a position that corresponds to at least a position of a bent area of the connecting electrode.

3. A polarization inversion method for a ferroelectric substance as defined in claim 1 wherein the pattern electrode comprises a plurality of periodic electrodes, which are arrayed with a predetermined period, and the connecting electrode is electrically connected to each of the periodic electrodes in order to connect the periodic electrodes to one another.

4. A polarization inversion method for a ferroelectric substance as defined in claim 3 wherein the electrical insulating material is located at a position that corresponds to at least a position of a bent area of the connecting electrode, which bent area is electrically connected to the periodic electrodes.

5. A process for producing an optical wavelength converting device, in which a polarization inversion method for a ferroelectric substance as defined in claim 3 is employed, the process comprising the steps of:
 a) utilizing a nonlinear optical crystal as the single-polarized ferroelectric substance crystal, and
 b) forming a periodic polarization inversion structure, which corresponds to a pattern of the periodic electrodes, in the nonlinear optical crystal.

6. A process for producing an optical wavelength converting device as defined in claim 5 wherein the electrical insulating material is located at a position that corresponds to at least a position of a bent area of the connecting electrode, which bent area is electrically connected to the periodic electrodes.

7. A process for producing an optical wavelength converting device as defined in claim 5 wherein the ferroelectric substance crystal is a crystal selected from the group consisting of an $LiNb_xTa_{1-x}O_3$ crystal, where $0 \leq x \leq 1$, an MgO-doped $LiNb_xTa_{1-x}O_3$ crystal, where $0 \leq x \leq 1$, a ZnO-doped $LiNb_xTa_{1-x}O_3$ crystal, where $0 \leq x \leq 1$, and an Sc-doped $LiNb_xTa_{1-x}O_3$ crystal, where $0 \leq x \leq 1$.

8. A polarization inversion method for a ferroelectric substance as defined in claim 1 wherein the ferroelectric substance crystal is a crystal selected from the group consisting of an $LiNb_xTa_{1-x}O_3$ crystal, where $0 \leq x \leq 1$, an MgO-doped $LiNb_xTa_{1-x}O_3$ crystal, where $0 \leq x \leq 1$, a ZnO-doped $LiNb_xTa_{1-x}O_3$ crystal, where $0 \leq x \leq 1$, and an Sc-doped $LiNb_xTa_{1-x}O_3$ crystal, where $0 \leq x \leq 1$.

9. A polarization inversion method for a ferroelectric substance, comprising the steps of:
 i) forming a pattern electrode, which has a predetermined pattern, and a connecting electrode, which is electrically connected to the pattern electrode, on one surface of a single-polarized ferroelectric substance crystal, and
 ii) applying an electric field across the ferroelectric substance crystal with irradiation of an electron beam to the ferroelectric substance crystal from the side of the other surface of the ferroelectric substance crystal, forming a polarization inversion region having a shape corresponding to the predetermined pattern of the pattern electrode in the ferroelectric substance crystal,
wherein the application of the electric field is performed in a state, in which an electrical insulating material is located on the other surface of the ferroelectric substance crystal and at a position that corresponds to at least a position of a certain area of the connecting electrode.

10. A polarization inversion method for a ferroelectric substance as defined in claim 9 wherein the electrical insulating material is located at a position that corresponds to at least a position of a bent area of the connecting electrode.

11. A polarization inversion method for a ferroelectric substance as defined in claim 9 wherein the pattern electrode comprises a plurality of periodic electrodes, which are arrayed with a predetermined period, and the connecting electrode is electrically connected to each of the periodic electrodes in order to connect the periodic electrodes to one another.

12. A polarization inversion method for a ferroelectric substance as defined in claim 11 wherein the electrical insulating material is located at a position that corresponds to at least a position of a bent area of the connecting electrode, which bent area is electrically connected to the periodic electrodes.

13. A process for producing an optical wavelength converting device, in which a polarization inversion method for a ferroelectric substance as defined in claim 11 is employed, the process comprising the steps of:
 a) utilizing a nonlinear optical crystal as the single-polarized ferroelectric substance crystal, and
 b) forming a periodic polarization inversion structure, which corresponds to a pattern of the periodic electrodes, in the nonlinear optical crystal.

14. A process for producing an optical wavelength converting device as defined in claim 13 wherein the electrical insulating material is located at a position that corresponds to at least a position of a bent area of the connecting electrode, which bent area is electrically connected to the periodic electrodes.

15. A process for producing an optical wavelength converting device as defined in claim 13 wherein the ferroelectric substance crystal is a crystal selected from the group consisting of an $LiNb_xTa_{1-x}O_3$ crystal, where $0 \leq x \leq 1$, an MgO-doped $LiNb_xTa_{1-x}O_3$ crystal, where $0 \leq x \leq 1$, a ZnO-doped $LiNb_xTa_{1-x}O_3$ crystal, where $0 \leq x \leq 1$, and an Sc-doped $LiNb_xTa_{1-x}O_3$ crystal, where $0 \leq x \leq 1$.

16. A polarization inversion method for a ferroelectric substance as defined in claim 9 wherein the ferroelectric substance crystal is a crystal selected from the group consisting of an $LiNb_xTa_{1-x}O_3$ crystal, where $0 \leq x \leq 1$, an MgO-doped $LiNb_xTa_{1-x}O_3$ crystal, where $0 \leq x \leq 1$, a ZnO-doped $LiNb_xTa_{1-x}O_3$ crystal, where $0 \leq x \leq 1$, and an Sc-doped $LiNb_xTa_{1-x}O_3$ crystal, where $0 \leq x \leq 1$.

* * * * *